United States Patent
Schrijen et al.

(10) Patent No.: US 8,848,477 B2
(45) Date of Patent: Sep. 30, 2014

(54) PHYSICAL UNCLONABLE FUNCTION WITH IMPROVED START-UP BEHAVIOR

(75) Inventors: Geert Jan Schrijen, Venlo (NL); Petrus Wijnandus Simons, Schaijk (NL); Erik Van Der Sluis, Utrecht (NL); Pim Theo Tuyls, Turnhout (BE)

(73) Assignee: Intrinsic ID B.V., Eindhoven (NL)

( * ) Notice: Subject to any disclaimer, the term of this patent is extended or adjusted under 35 U.S.C. 154(b) by 0 days.

(21) Appl. No.: 13/877,656

(22) PCT Filed: Sep. 28, 2011

(86) PCT No.: PCT/EP2011/066871
§ 371 (c)(1),
(2), (4) Date: Apr. 3, 2013

(87) PCT Pub. No.: WO2012/045627
PCT Pub. Date: Apr. 12, 2012

(65) Prior Publication Data
US 2013/0194886 A1    Aug. 1, 2013

(30) Foreign Application Priority Data
Oct. 4, 2010   (EP) ..................................... 10186435

(51) Int. Cl.
*G11C 5/14*   (2006.01)
(52) U.S. Cl.
CPC . *G11C 5/148* (2013.01); *G11C 5/14* (2013.01)
USPC ........................ 365/226; 365/185.04; 365/195
(58) Field of Classification Search
CPC ............ G11C 5/14; G11C 5/148; G11C 7/24; G11C 13/0059; G11C 16/22; G11C 2029/0407
USPC ..................... 365/226, 185.04, 195
See application file for complete search history.

(56) References Cited

U.S. PATENT DOCUMENTS

| | | | | |
|---|---|---|---|---|
| 4,279,020 | A | * | 7/1981 | Christian et al. ............... 713/323 |
| 5,615,162 | A | * | 3/1997 | Houston ........................ 365/226 |
| 7,613,063 | B2 | * | 11/2009 | Hwang et al. .................. 365/226 |
| 2008/0239809 | A1 | * | 10/2008 | Chae et al. ............... 365/185.09 |

FOREIGN PATENT DOCUMENTS

| | | |
|---|---|---|
| EP | 2 230 793 | 9/2010 |
| WO | WO 2009/024913 | 2/2009 |
| WO | WO 2009/128044 | 10/2009 |

OTHER PUBLICATIONS

International Search Report for PCT/EP2011/066871, mailed Dec. 7, 2011.
Written Opinion for PCT/EP2011/066871, mailed Dec. 7, 2011.
Holcomb et al., "Power-up SRAM State as an Identifying Fingerprint and Source of True Random Numbers", *EEE Transactions on Computers*, vol. 57, No. 11, Nov. 1, 2008, pp. 1-14.

* cited by examiner

*Primary Examiner* — Tan T. Nguyen
(74) *Attorney, Agent, or Firm* — Nixon & Vanderhye P.C.

(57) ABSTRACT

An electric physical unclonable function (PUF) (100) is provided comprising a semiconductor memory element (110) connectable to a PUF control means for reading content from the memory element and for deriving at least in part from said content a digital identifier, such as a secret key. Upon powering the memory element it settles into one of at least two different stable states. The particular stable state into which the memory element settles is dependent at least in part upon random physical characteristics of the memory element introduced during manufacture of the memory element. Settling of the memory element is further dependent upon a control input (112) of the memory element. The electric physical unclonable function comprises shielding means (142, 144) for shielding, during a time period including the power-up of the memory element and lasting at least until the settling of the memory element, the control input from receiving control signals upon which the particular stable state into which the memory element settles is dependent. In this way, the dependency of the memory element on its physical characteristics is improved, and dependency on possibly irreproducible control signals is reduced.

18 Claims, 9 Drawing Sheets

US 8,848,477 B2

PHYSICAL UNCLONABLE FUNCTION WITH IMPROVED START-UP BEHAVIOR

This application is the U.S. national phase of International Application No. PCT/EP2011/066871 filed 28 Sep. 2011 which designated the U.S. and claims priority to EP Application No. 10186435.3 filed 4 Oct. 2010, the entire contents of each of which are hereby incorporated by reference.

The invention relates to an electric physical unclonable function.

In particular, the invention relates to an electric physical unclonable function (PUF) comprising a semiconductor memory element connectable to a PUF control means for reading content of the memory element and for deriving at least in part from said content a digital identifier, the memory element being of a type that is configurable into at least two different stable states, the stable states representing the content of the memory element, the memory element being configured to settle into one of the at least two different stable states upon power-up, the particular stable state into which the memory element settles being dependent at least in part upon the at least partially random physical characteristics of the memory element.

The invention further relates to a method of operating an electric physical unclonable function.

BACKGROUND OF THE INVENTION

Physical unclonable functions (PUFs) have proven to be advantageous alternatives for many forms of secure identification, including the storing of keys, identifiers and the like in secure memories.

A physical unclonable function exploits manufacturing variations to derive a digital identifier. The digital identifier is thus tied to a physical medium. Because the physical unclonable function depends on random process variation, it is easy to create a PUF but it is very hard, if not downright impossible, to create a PUF which would give rise to a particular pre-determined identifier. The manufacturing variations lead to different physical characteristics of the memory element. For example, the physical characteristics may include: doping concentrations, oxide thickness, channel lengths, structural width (e.g. of a metal layer), parasitic (e.g. resistance, capacitance). When a digital circuit design is manufactured multiple times, these physical characteristics will vary slightly and together they will cause the behavior of an IC element, e.g., a memory element, to behave differently in some situations. For example, the start-up behavior is determined by manufacturing variations in the physical characteristics.

This property of PUFs makes them suitable for a range of applications. For example, PUFs may be used to combat counterfeiting. Although, it may be possible to fraudulently copy a particular device of other manufactured item, it would not be possible to duplicate a PUF which could be embedded therein with sufficient precision so that it would give rise to the same digital identifier as the original. As a further example, PUFs are used to create cryptographic keys. Using a PUF the need for secure memory to store a key is circumvented. A PUF furthermore provides natural protection against illegal attempts to obtain the cryptographic key through reverse engineering, since damage which could be inflicted to the PUF during the attempt would change the digital identifier. Preferably, the digital identifier is unique for the electronic physical unclonable function.

PUFs have been advantageously applied in electronic devices. Even tiny manufacturing variations which are unavoidable during manufacture of an IC lead to different properties of the IC. These different properties are normally suppressed, in an effort to obtain a batch of IC that operate in the same manner. However, to create a PUF the differences among individual ICs in a batch of IC are exploited.

For example, it has been observed that the startup behavior of some memory elements, demonstrate PUF like behavior. When such memory is powered-up, or booted, it tends to contain content, i.e., comprise a sequence of data values, which depends on the at least partially random physical characteristics of the components, e.g., gates or transistors, which make up the memory, e.g., their physical arrangement relative to each other. If the memory is powered-up multiple times, it would contain, up to a large percentage, the same content. Unfortunately, since the PUF behavior depends on small fluctuations, a certain error percentage is unavoidable. An error correction procedure, using so-called helper data, can be used to correct for these fluctuations, and make sure an identical digital identifier is derived, each time the PUF is used.

It is thus desirable that the content of a memory, when compared after multiple power-down and power-up sequences is identical to a large extend. At the same time it is desirable, that when content of the memory is compared to other memories of the same type it is for a large percentage different.

It is an insight of the inventors that both these goals would be furthered if the dependency of the start-up value of a memory on the at least partially random physical characteristics of the memory would be strengthened.

SUMMARY OF THE INVENTION

It would be advantageous to have an improved physical unclonable function wherein the dependency of the start-up value of a memory on its at least partially random physical characteristics is improved.

The electric physical unclonable function (PUF) according to the invention comprises a semiconductor memory element connectable to a PUF control means for reading content of the memory element and for deriving at least in part from said content a digital identifier. The memory element is of a type that is configurable into at least two different stable states, the stable states representing the content of the memory element. The memory element comprises a power input for electrically powering the memory element and bringing the memory element into a powered-up state, and a control input for receiving one or more control signals, the control signals configuring the memory element into a selected one of the at least two different stable states. The memory element is configured to settle into one of the at least two different stable states upon power-up, the particular stable state into which the memory element settles being dependent at least in part upon the at least partially random physical characteristics of the memory element. The particular stable state into which the memory element settles upon power-up is also dependent upon the control input receiving a control signal. The electric physical unclonable function further comprises shielding means for shielding, during a time period including the power-up of the memory element and lasting at least until the settling of the memory element, the control input from receiving control signals upon which the particular stable state into which the memory element settles is dependent.

After creating experimental set-ups and performing numerous measurements the inventors have brought to light a source of disturbance which reduces the dependency of the start-up value of a memory on its at least partially random physical characteristics. Memory elements which can receive control signals for controlling them, i.e. for writing to them, may be disturbed during start-up. This disturbance may take one of two forms.

In the first form, the memory element may be overwritten by a control signal arriving during start-up. Although the memory element would in principle contain suitable start-up values and be usable as a PUF, its content is overwritten by spurious signals on its control signal input. An example of the first type of signal is a write signal. In a second form, a control signal does not overwrite the contents of the memory element as such, but activates part of the memory element, these additional active gates or transistors influence the settling of the gates responsible for keeping the content of the memory element. The more gates are involved in determining the start-up value the more dependent on chance variations the start-up and hence the more unstable the memory element is. An example of the second type of disturbing control signal is a clock signal.

To make matters worse, powering an electronic circuit such as a semiconductor circuit is not completely predictable and deterministic. The two types of problematic signals may not necessarily occur on each start up. Various system events, such as the time the memory element takes to settle or the time between power-up and the first clock tick of a clock, may vary somewhat. For example, a clock tick might arrive just before the memory element settled into its start-up value, or just after. In the first case, more gates were active during the settling than in the latter, the reliability of the memory element as a PUF is thus reduced.

One solution to this problem would be to select memory elements without a control input for receiving one or more control signals. However, there is a strong preference to use standard memory elements from standard semiconductor libraries. Such a standard memory element naturally has a control input since otherwise it would not be writable. Note that a read only memory element would be unsuitable for another reason; by design a standard read only memory element starts-up in a predetermined state, and not in a state determined by some random physical characteristics. Preferably, the memory element is a volatile, writable memory.

The memory element used in the invention is a memory element that comprises a control input over which it could receive control signals. Using those control signals it would be possible to control which stable state the memory element maintains, i.e., one may write to the memory element using the control signals.

During operation the invention operates as follows, initially the memory element is not powered, and would be unresponsive to control signals, even if they would arrive. Typically, this situation corresponds with a device which is currently turned off. But this is not necessary, in some embodiments, memory elements may be powered-off, for example, to preserve power, or to be able to re-read the PUF after its content has been overwritten. At some point in time the memory element is powered. The memory element then settles into a stable state. Which state the element settles in is determined, at least in part, by the at least partially random physical characteristics of the components, e.g. gates, which make up the memory element. Other than powering the memory element no actions external to the memory element are needed to make the memory element settle into a stable state.

During the powering of the memory element, control signals may come into being on a control line connected to a control input of the memory input. However, a shielding means is connected to the control input to avoid the control signal reaching the memory element. Without the shielding means said control signals would influence or even determine the stable states into which the memory element settles. The shielding means is operative until the PUF control means has read out the content of the memory element.

The memory element is in principle writable, however, the shielding means may have as a side-effect that this capability is suppressed, possibly permanently, for example, by providing a direct and permanent connection to a reference voltage line, forcing the memory element in a 'keep' state, i.e., a state in which the memory element keeps it current state and prevents being overwritten.

A stable state is typically implemented as a stable charge distribution across the semiconductor gates of the memory element.

The interconnected semiconductor gates may comprise at least two gates connected in a cross-coupled loop. One way to arrange gates so that they are able to attain more than one stable state, in particular bi-stable, is to connect in them in a cross-coupled loop. For example, an output of a first gate may be connected to an input of a second gate, while an output of the second gate may be connected to an input of the first gate. The invention may be applied particularly advantageously to a memory element wherein the gates of the cross-coupled loop have more than one input gate, so called multiple input gates. Cross-coupled loops of multiple-input gates are a preferred way to build memory elements. The multiple inputs make it relatively easy to create versatile memory elements with many desired properties, since the state attained by the memory element, e.g. by the cross coupled loop, may be influenced by controlling one of the other inputs of the gates which is not itself, directly connected to an output of another gate of the cross-coupled loop. This very property makes them also prone to influence during start-up. Spurious signals on any one of the multiple inputs may influence the start-up behavior of the cross-coupled loop. By shielding the cross-coupled loop from control signals which may arrive during power-up, the dependency on the at least partially random physical characteristics is increased, while dependency on random irreproducible start-up phenomena in the control signals is decreased. Examples of a multiple input gate include NAND gates or NOR gates. Invertors are not multiple-input gates, since the only have a single input.

Preferably, the digital identifier identifies the electronic PUF. The content of the memory element may only consist of one bit. Although one bit would not be sufficient to identify a device, multiple memory elements together would be able to do so. A multi-bit memory element may be used to obtain more bits from a single memory element. It is preferred if the power-up contents of the memory element is varied across different instantiations of the memory element. For example, if multiple devices comprising an electronic PUF according the invention are manufactured according the invention, then it is preferred that some devices would produce a logic '1' when powering up the memory element and some would produce a logic '0' when powering up the memory element. If the memory element comprises multiple bits, then the same holds for each bit of such a memory element.

In an embodiment, the memory element comprises a plurality of interconnected semiconductor gates allowing at least two different stable states when the memory element is in the powered-up state, the physical, at least partially random, characteristics of the memory element comprising the at least partially random physical characteristics of the plurality of interconnected semiconductor gates; For example, the physical, at least partially random, characteristics of the memory element comprises the physical arrangement of the plurality of interconnected semiconductor gates, e.g. the physical arrangement of the plurality of interconnected semiconductor gates relative to each other.

In an embodiment, the electric physical unclonable function (PUF) comprises a semiconductor memory element connectable to a PUF control means for reading content of the memory element and for deriving at least in part from said content a digital identifier identifying the memory element. The memory element comprises a power input for electrically powering the memory element and bringing the memory element into a powered-up state, plurality of interconnected semiconductor gates allowing at least two different stable states when the memory cell is in the powered-up state, the stable states representing the content of the memory cell, the memory element being configured to settle into one of the at least two different stable states upon power-up, the particular stable state into which the memory element settles being dependent at least in part upon the at least partially random physical characteristics of the plurality of interconnected semiconductor gates, and a control input for receiving one or more control signals. The memory element is configured for changing from one stable state to another upon receiving at least one control signal while the memory element is in the powered-up state. The particular stable state into which the memory element settles upon power-up is also dependent upon the control input receiving a control signal. The electric physical unclonable function further comprises shielding means for shielding, during a time period including the power-up of the memory element and at least until the reading of the content of the memory element by the PUF control means, the control input from receiving control signals upon which the particular stable state into which the memory element settles is dependent.

The invention may be applied to many types of memory elements, for example, the memory element may be a latch, a flip-flop or a register. These memory elements have the additional advantage that they do not need to be present in visually conspicuous memory arrangements, but may be spread across a larger area of an IC. For example, in a single IC multiple memory elements may be present which together provide inputs to the PUF control means. For example, multiple latches and/or flip-flops and/or registers may be distributed across the IC.

The deriving of the digital identifier by the PUF control means may depend on a first type of data and a second type of data. The first type of data is data which was previously, i.e. before the deriving, deterministically stored in a non-volatile memory. Furthermore the digital identifier depends on the stored values and not on any manufacturing variations which may be present in the non-volatile memory in which the data of the first type is stored. The second type of data does depend on random manufacturing variation, i.e., on the at least partially random physical characteristics of a memory element.

The stable states into which the memory element settles upon power-up is subject to noise, i.e. to change with an error-probability. Preferably, the PUF control means is configured for applying an error correcting algorithm to the content of the memory element using previously stored redundancy information. The noise, i.e., the error-probability, being sufficiently small for the PUF control means to determine the correct stable state, i.e., the remove the influence of noise from the read content. If anti-aging is applied, the inverse of the correct stable state may be written to the memory element.

An example of data of the first type is helper data which is stored in a non-PUF, non-volatile, writable memory such as a flash memory, EPROM memory, EEPROM etc. The memory for storing data of the first type may be rewritable or write-once memory. The start-up content of the memory element, i.e., the particular stable state into which the memory element settles is an example of data of the second type since it is dependent at least in part upon the at least partially random physical characteristics of the plurality of interconnected semiconductor gates.

For example, the PUF control means may read data of the second type as content from a plurality of memory elements and read helper data from a non-volatile memory. Using a helper Data algorithm, also known as a Fuzzy Extractor, e.g. executed on the PUF control means the data of the second type is processed using the data of the first type. As a result of this processing the variation which may be present in the data of the second type, i.e., PUF data, is removed.

Non-volatile memory for storing data of the first type, e.g., helper data, need not necessarily be comprised in the electronic physical unclonable function. The data may be received when needed via a communication element comprised in the electronic physical unclonable function.

In an embodiment at least one of multiple memory elements from which the control means obtains the data of the second type which it uses for deriving the digital identifier is provided with shielding means for shielding control signals during power-up. It is also possible, that part of the memory elements for obtaining data of the second type has shielding means; in an embodiment, the majority of such memory elements are shielded.

In an embodiment, all data of the second type used by the PUF control means to derive the digital identifier is obtained exclusively from one or more memory elements having shielding means. Preferably, all of the one or more memory elements are comprised in the electronic physical unclonable function. During operation, the PUF control means obtains all the data of the second type which it uses for deriving the digital identifier from memory elements which were shielded during power-up with their shielding means.

There are several ways in which a shielding means may be constructed. For example, the shielding means may be configured to connect the control input with a reference voltage line. Examples of reference voltage lines include a ground, a power supply rail, a voltage rail, etc. A voltage reference line provides a single voltage, typically provided by a power supply unit (PSU), relative to a ground. By connecting a control input with a reference voltage line, the input to the control input is fixed, variations which could occur during power-up on the line connected to the control input are thus suppressed. For example, the control input could be connected to reference voltage lines to force the memory element in a keep state in which its content is shielded from outside influences, i.e., it cannot be overwritten.

A memory element having multiple control inputs may be connected to multiple reference voltage lines. All control inputs may be connected to the same reference voltage line but this is not necessary. For example, a first control input of the multiple control inputs may be connected to a positive supply voltage, a second control input may be connected to a negative supply voltage. A memory element which needs different inputs to enter into a keep state can be shielded by connecting each input to the appropriate voltage rail.

The connection between the control input and the reference voltage line may be a permanent connection. This is a particular efficient and cost effective way to shield a memory element. For example, one may place a standard memory element such as a latch or a flip-flop from a semiconductor library, such as a standard cell library, and create a low-cost PUF from it by connecting its control inputs to a reference voltage line. In this way an element is obtained whose start-up value, i.e., its power-up content is highly dependent on the at least partially random physical characteristics of the one or more memory elements, e.g., the precise arrangement in which its components are arranged in the IC substrate. It is noted, that using a standard cell is in no way an impediment to obtaining PUF behavior. Even a standard cell will be placed slightly different in each instantiation of the electronic device; some parts of the cell being slightly deformed when compared to other parts.

In an embodiment, the memory element comprises a latch, having a set control input and a reset control input, the set control input and the reset control input being connected to the reference voltage line such that the latch is in a keep state for preventing the stable state into which the latch settles upon power-up being dependent upon the set control input and the reset control input.

For example, the latch may be a so-called SR latch, e.g., an SR NOR latch or an SR NAND latch. The latch may use static gates as building blocks, and be constructed from a pair of cross-coupled NOR (that is 'Not OR') logic gates. An SR NOR latch may be forced in the keep-state by connecting both control inputs to ground. The stored bit is present on an output, typically marked Q. Alternatively, the SR latch may be built with NAND (that is 'not AND') logic gates. Set and reset now become active low signals, which may be connected to a positive reference voltage to force the latch in the keep state.

Permanently connecting the control inputs of a memory element have as a side effect that changing the content of the memory element, i.e., writing to the memory element, is also permanently disabled. It is advantageous however, to only temporarily disable the writing capability of the memory element. If the memory element can be written to, after the PUF control means has used its contents for deriving the identifier, the memory element could be used for other functions which need data storage. However, another advantageous application of retaining write capabilities is to write anti-aging data to the memory element.

For example, the electric physical unclonable function may comprise anti-aging means for writing anti-aging data into the memory element after reading the content of the memory element. It has been observed that the quality of memory elements for use in a PUF may decrease over time. This phenomenon may be slowed by writing anti-aging data to the memory element. The anti-aging data may be the inverse of the content of the memory element during a previous reading. For example, the anti-aging data may be the inverse of the content of the memory element as was obtained by the PUF control means to construct the digital identifier. However, this anti-aging data will vary somewhat as the content of the memory element varies. It is preferred to reconstruct the content of the memory element during a previous reading using helper data to remove this variability.

The shielding means may comprise a timer, for shielding for a time period starting with the power-up of the memory element and lasting for a predetermined period of time. The time period of the timer should be long enough for the memory element to settle into a stable state. Typically, a time period lasting one or two clock cycles is sufficient. One may also set the time limit to a high limit, e.g., to block control signals, e.g. writing control signals, for one millisecond, to guarantee the memory element time to settle. The timer may be set to a value which is sufficiently high for the PUF control means to complete reading the content of the memory element. Alternatively, the timer may be set lower, e.g., only blocking control signals during power-up, after which software means or other hardware means block control signals until the PUF control means has completed reading the content.

To protect the settling from control signals it is sufficient if the time period of the timer is at least as long as the settling of the memory element. The person skilled in the art may obtain upper bounds on the settling time of the memory element in various ways. The settling time for most commonly used memory elements are known from their specification. The settling time may also be determined by experiment. It is not necessary to obtain a precise measurement for the settling time, for the purposes of the invention it is sufficient if to have an upper bound, i.e., a time interval after which the memory element will have settled at start-up. For example, to measure the power-up settling time the skilled person could disable and enable the memory and read the contents at various moments and determine after what amount of time the memory elements do not change anymore.

For example, the shielding means may be configured to stop the shielding of the memory element after the reading of the content of the memory element by the PUF control means to allow writing of content to the memory element by enabling the memory element to change from one stable state to another upon receiving a control signal while the memory element is in the powered-up state.

The invention may be applied to several types of control inputs. For example, shielding may be applied to a control input for receiving data for overwriting the content of the memory element, or to a control input for receiving enable signals for enabling the memory element to overwrite its contents. The invention may however also be applied advantageously to a control input such as a clock input. The clock input being arranged for receiving a clock signal comprising a clock tick, typically one of a plurality of clock ticks. The shielding means is configured for shielding the clock input from receiving the clock tick. If at least part of the memory element is activated upon receiving a clock tick over the clock input, then receiving a clock tick changes the behavior of the memory element during power-up if only ever so slightly. If fewer gates are involved during the settling of the memory element, the interaction between them is less random and it will be more likely that the outcome is determined by intrinsic properties of the memory element instead of by chaotic interaction.

Shielding the clock input is particularly advantageous if a register is used as the memory element. For example, the memory element may comprise a register having a gated clock, wherein shielding means is configured to control the gating of the gated clock. For example, the gating may be controlled using a timer so that it is avoided that the register is clocked during power-up, but that the memory element receives clock signals after the time period expired.

A memory element comprising two cross-coupled loops may be used to create an electronic PUF having multiple challenges. The shielding means being configured for shielding the clock input by selectably connecting the clock input to a high reference voltage or to a low reference voltage, the selected voltage further selecting one of the two cross-coupled loops, the particular stable state into which the memory element settles upon power-up being dependent upon the at least partially random physical characteristics of the selected one of the two cross-coupled loops but not upon the unselected one of the two cross-coupled loops.

Connecting the clock input to a high reference voltage or to a low reference voltage may be seen as a first and second challenge. The first and second challenge would lead to a different response of the memory element. The PUF control means may derive a first or second identifier in dependence upon the first or second challenge was used.

The first challenge may be used, together with first helper data to obtain a first cryptographic key. The first cryptographic key may be used for a user application, for example, the first cryptographic key may be used to decrypt video in an on-demand video service. The second challenge may be used, together with second helper data to obtain a second cryptographic key. The second cryptographic key may be used for a different application. For example, while the first cryptographic key would be known to an application designer, the second cryptographic key may be known only to the manufacturer. Using a standard challenge-response algorithm, the electronic device may verify if one has the second cryptographic key, and if so allow full-access to the device, e.g., for debugging field returns.

The shielding means may be constructed using a combination of hardware and software. In an embodiment, the shielding means comprises hardware shielding means for shielding, at least during a time period lasting until completion of the power-up of the memory element the control input from receiving control signals upon which the particular stable state into which the memory element settles is dependent, and software shielding means for shielding, at least during a time period lasting from the completion of the power-up of the memory element until the reading of the content of the memory element by the PUF control means the control input from receiving control signals upon which the particular stable state into which the memory element settles is dependent.

Typically, a memory element is configurable into one of its at least two different stable states by writing to it at some point after start-up. Note however, that the memory element need not necessarily be configured, e.g. wired, in the electric physical unclonable function in such a way that writing to the memory element is supported by the electric physical unclonable function as a whole.

A further aspect of the invention concerns a method of operating an electric physical unclonable function (PUF) comprising a semiconductor memory element. The memory element is of a type that is configurable into at least two different stable states. The stable states represent the content of the memory element, the memory element comprises a control input for receiving one or more control signals, the control signals configuring the memory element into a selected one of the at least two different stable states. The method comprises powering the memory element and bringing the memory element into a powered-up state, the memory element settling into one of the at least two different stable states upon the powering. The particular stable state into which the memory elements settles being dependent at least in part upon the at least partially random physical characteristics of the memory element, reading content of the memory element, and deriving at least in part from said content a digital identifier. The particular stable state into which the memory element settles upon power-up is also dependent upon the control input receiving a control signal. The method further comprises shielding, during a time period including the power-up of the memory element and lasting at least until the settling of the memory element, the control input from receiving control signals upon which the particular stable state into which the memory element settles is dependent.

The memory element settles into a stable state as a result of being powered-up.

In an embodiment, the electric physical unclonable function is comprised in any one of an RFID tag, smart card, mobile phone, set-top box, computer, laptop, netbook, a set-top box, an electronic circuit, etc. The electronic circuit may be an integrated circuit, e.g., a CMOS device. The method according to the invention may be employed on any of these devices.

The digital identifier may be used as a cryptographic key, either directly or as starting value for a key derivation algorithm. For example, a hash function may be applied to the digital identifier and the resulting value may be used as a symmetric key. The digital identifier may also be used as a seed for the derivation of a public-private key pair. The private key part of the public-private key pair may be used in subsequent signing operations. The identifier may also be used as symmetric signing key, e.g., a MAC key.

An electric physical unclonable function (PUF) is provided comprising a semiconductor memory element connectable to a PUF control means for reading content from the memory element and for deriving at least in part from said content a digital identifier, such as a secret key. Upon powering the memory element it settles into one of at least two different stable states. The particular stable state into which the memory element settles is dependent at least in part upon random physical characteristics of the memory element introduced during manufacture of the memory element. Settling of the memory element is further dependent upon a control input of the memory element. The electric physical unclonable function comprises shielding means for shielding, during a time period including the power-up of the memory element and lasting at least until the settling of the memory element, the control input from receiving control signals upon which the particular stable state into which the memory element settles is dependent. In this way, the dependency of the memory element on its physical characteristics is improved, and dependency on possibly irreproducible control signals is reduced.

BRIEF DESCRIPTION OF THE DRAWINGS

The invention is explained in further detail by way of example and with reference to the accompanying drawings, wherein.

Throughout the Figures, similar or corresponding features are indicated by same reference numerals.

Figure 1:
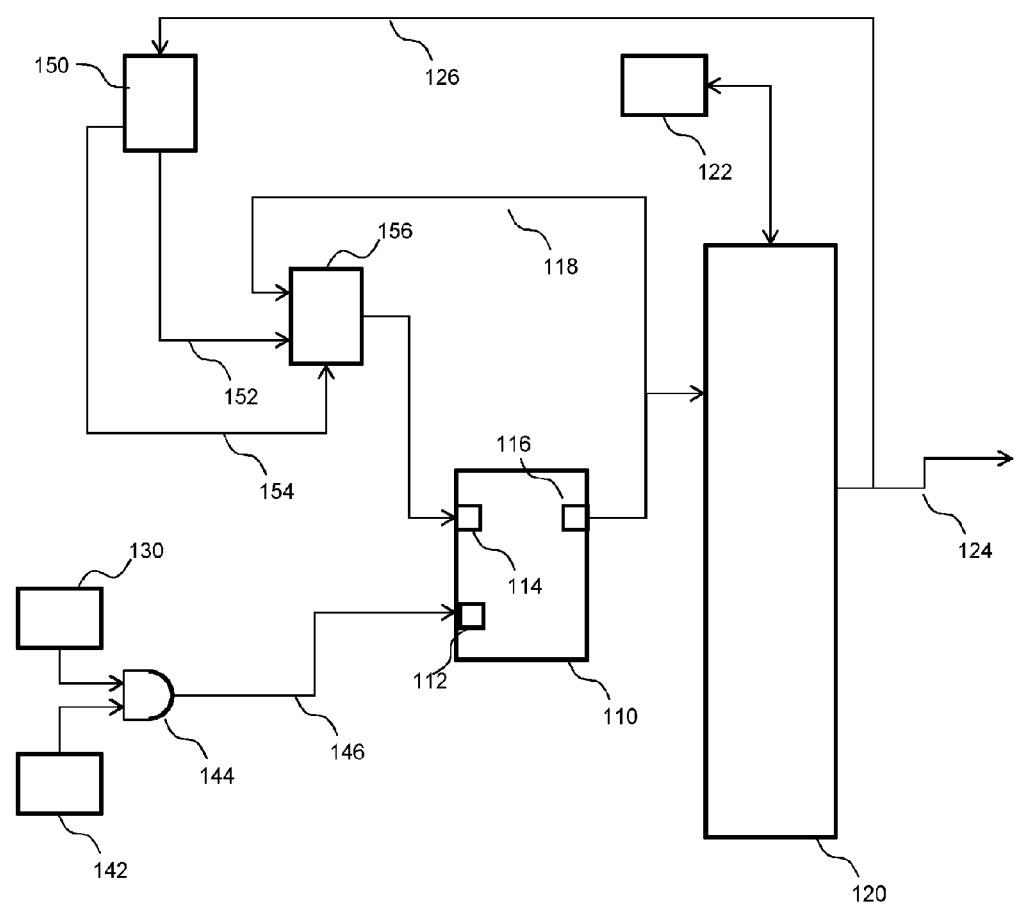
FIG. 1 is a block diagram illustrating a first embodiment of an electric physical unclonable function according to the invention.

LIST OF REFERENCE NUMERALS 100 an electric physical unclonable function (PUF)
110 a memory element
112 a control input
114 a data input
116 a data output
118 a data line
120 a PUF control means
122 a helper data memory
124 a PUF output
126 a data line for transferring a reconstructed reading
130 a clock
142 a timer
144 an and gate
146 a control input line
150 an anti-aging means
152 an anti-aging data line
154 a MUX control line
156 a MUX
200 an electric physical unclonable function (PUF)
210 a latch
215 a positive supply voltage
220 a PUF control means
230,240 a NAND gate
410, 420, 430 a latch
500 a master slave flip-flop
510 a first D-latch
520 a second D-latch
512 a control input
514 a data input
516 a data output
530 a clock
540 a challenge selector
542 a timer
543 a selection signal
544 a MUX
546 a control input line
700 a diagram
710 a first time period
715 an end of the first time period
720 a second time period
725 an end of the second time period
730 a third time period
800 a smart card
805 a card
810 an integrated circuit
820 a processing unit
822 a memory
824 a physical unclonable function
826 a communication element
830 a bus
900 a method of operating an electric physical unclonable function
910 shielding the control input from receiving control signals
920 powering the memory element
930 settling the memory element
940 reading content of the memory element
950 deriving a digital identifier
960 writing anti-aging data to the memory element

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

First some information is given which is relevant for some of the embodiments of the inventions.

Physical Unclonable Functions

A Physical Unclonable Function (PUF) is a function which is embodied as a physical system, in such a way that an output of the function for an input is obtained by offering the input to the physical system in the form of a stimulus, and mapping the behavior that occurs as a result of an interaction between the stimulus and the physical system to an output, wherein the interaction is unpredictable and depends on essentially random elements in the physical system, to such an extent, that it is unfeasible to obtain the output, without having had physical access to the physical system, and that it is unfeasible to reproduce the physical system. Preferably, a PUF is also easy to evaluate. For practical uses, PUFs are preferably low in manufacturing costs.

Conventionally, an input or stimulus that a PUF accepts is called a 'challenge'. The output of a PUF, that is, the behavior the PUF exhibits after interaction with the stimulus, is called a 'response'. A pair comprising a challenge and the corresponding response of a PUF is called a challenge-response pair. Some types of PUFs allow a wide range of different inputs, some types allow a more limited range of inputs, or may even allow only a single input. Challenging a PUF with some single challenge may also be called an 'activation' of the PUF.

It would be most preferable, if a PUF when evaluated multiple times for the same challenge would produce multiple responses which are all equal. This property is not necessary though, and, in practice, most PUFs do not posses it. As long as the multiple responses lie sufficiently close to each other, the PUF can be usefully applied.

The PUF data obtained from reading memory elements in the undefined state they have at power-up often use only a single challenge, i.e. powering up the memory element. For simplicity we will often ignore the challenge and only refer to the PUF value or the like. However, as is demonstrated in some of the embodiments of the invention it is possible to obtain at least to a certain extend a PUF based on a memory element which allows more than one challenge, e.g., a master-slave flip-flop. It is to be understood therefore that if we consider PUF data with referring to the challenge, they may be used in an embodiment which uses only a single challenge, but they could also be used in an embodiment allowing multiple challenges of which one has been fixedly chosen for the current application. For example, a different challenge may be chosen for a different purpose. For example, a first challenge may be chosen for all regular user applications, while a second challenge may be reserved for secure debugging of field returns.

Since the interaction between a stimulus and the physical system cannot be predicted without access to the system, the PUF is hard to characterize and to model. The output of a particular PUF for an input can therefore only be obtained using the particular physical system underlying the particular PUF. Possession of a challenge-response pair is a proof that at some point the challenge was offered to the unique physical system that underlies the PUF. Because of this property, i.e., the property that challenge-response pairs are coupled to a unique physical device, a PUF is called unclonable. By equipping a device with a PUF, the device also becomes unclonable.

Physical systems that are produced by a production process that is, at least in part, uncontrollable, i.e., a production process which will inevitably introduce some randomness, turn out to be good candidates for PUFs.

One advantage of PUFs is that they inherently possess tamper resistant qualities: disassembling the PUF to observe its working, will also disturb the random elements and therefore also disturb the way inputs are mapped to outputs. Various types of PUFs are known in the art, including various types of electronic PUFs, including various types of PUFs based on electronic memories. PUFs may also be based on other concepts, e.g., optical PUFs. In an optical PUF the optical response is measured of an optically active system.

Examples of volatile memory elements showing PUF behavior are a flip-flop and a latch. At start up, the memory element, such as may be included in an integrated circuit, will be filled with a random value. The random value depends on the precise variations in the production process while the memory element was manufactured. A slight alteration in the configuration of the various components that construct the memory element may alter the random value. The partial random characteristics are not specifically caused by the particular layout of the memory element or its corresponding mask used during its manufacture, but are caused during the transfer from a mask to an actual physical structure, e.g. the physical structure of the memory element.

The integrated circuit layout, also known as IC layout, IC mask layout, or mask design, is the representation of an integrated circuit in terms of planar geometric shapes which correspond to the patterns of metal, oxide, or semiconductor layers, etc that make up the components of the integrated circuit. Even though the same layout may be used multiple times to create multiple instantiations of a semiconductor memory element, the transfer of the design from the layout to the physical memory element invariably adds some variation causing different physical characteristics and different power-up behavior. As a result, it is unpredictable with what content a particular memory element will power-up without physically performing the measurement, i.e., one must have had access to a memory element to know how it will power-up.

Due to unavoidable variations during production, e.g. deep submicron process variations, the behavior of the components of a memory element relative to each other is at least slightly random. These variations are reflected, e.g., in a slightly different threshold voltage of the transistors in the memory cell. When the memory element is read out in an undefined state, e.g., before a write action, its output depends on the random configuration. Producing a new memory element, with the same characteristic behavior requires producing the same configuration, a configuration which was achieved randomly. As this is unfeasible, the memory element is unclonable as a physical system, that is, it is a PUF.

A further example of PUFs is the so-called Butterfly PUF. The Butterfly PUF comprises a plurality of butterfly PUF cells. A butterfly PUF cell comprises a cross-coupling of two latches or flip-flops. The butterfly PUF can be implemented on a Field Programmable Gate Array (FPGA). The butterfly PUF is also able to extract an identifier, in particular secrets, such as secret keys, from the complex physical characteristics of the integrated circuits on which it is implemented. Butterfly PUFs are explained more fully in the following paper: Sandeep S. Kumar, Jorge Guajardo, Roel Maes, Geert-Jan Schrijen, Pim Tuyls, "The butterfly PUF protecting IP on every FPGA,", pp. 67-70, 2008 IEEE International Workshop on Hardware-Oriented Security and Trust, 2008. The butterfly PUF is also described in the international patent application "Identification of Devices Using Physically Unclonable Functions", published as WO2009/024913, and incorporated herein by reference; see in particular FIGS. 8 and 10, and the corresponding description of WO2009/024913.

One application of PUFs is to derive a cryptographic key on an electronic circuit. The electronic circuit typically includes an integrated Circuit (IC) and/or programmable logic. The programmable logic comprises, e.g., a field-programmable gate array (FPGA), a programmable logic device (PLD), or a digital signal processor (DSP), a microprocessor, etc. Instead of storing the cryptographic key in a non-volatile memory of some kind, the key is generated from the PUF only when the key is needed by the device. The key can be deleted when it is no longer needed. The next time the key is needed, it can be derived again from the PUF. Since the PUF may not give the exact same result when the same challenge is evaluated twice, a so-called Helper Data algorithm, also known as a Fuzzy Extractor, may be used to ensure that the key will be the same, each time it is derived. One way of using helper data to construct reproducible output values from noisy measurements is described, e.g., in international patent application WO 2006/129242, "Template Renewal in Helper Data Systems", and in international patent application WO/2004/066296, "Reliable Storage Medium Access Control Method And Device", both incorporated herein by reference.

One way to use a PUF to create a cryptographic key is as follows. First, during an enrollment phase, a challenge-response pair is created. Then, using the fuzzy extractor, also known as a shielding function, helper data is created, see e.g. WO/2004/066296. On the device, the challenge and the helper data are stored in a non-volatile memory. To derive the cryptographic key, a new response is obtained by evaluating the PUF for the challenge again. By combining the new response with the stored helper data, according to a helper data algorithm, a key is derived. The helper data ensures that the key is the same, each time it is derived.

Helper Data

Helper data, also known as an activation code, is data that is created from a first PUF response, sometimes referred to as a measurement, and a particular data item so that later the particular data item may be exactly reconstructed from a second PUF response and the helper data, even though the first and second PUF response may differ slightly. The differences in the second response compared with the first response may be called 'errors'. The helper data can be regarded as error correcting data, in the sense that it corrects for errors in the second response. The function of helper data can encompass more than mere error correcting. For example, together with correcting errors in the second response the helper data can map the response to a predetermined data item, e.g., key. The first response may be called the enrollment response. If the PUF allows multiple inputs, then the first and second responses are taken for the same input, i.e., challenge. Helper data is specific for the challenge, thus when referring to the helper data, it is assumed that there is only a single challenge or that a specific challenge has been singled out.

Helper data can also be defined for a set of challenges. For example, helper data can define a selection of certain challenges, the response to which are combined in order to derive a value or bit string.

There exists a number of ways to create helper data. Using helper data only a limited number of errors can be corrected.

How many errors can be corrected depends on the type of helper data and the parameters used during the construction of the helper data.

The data item may be a cryptographic key or the enrollment response itself. The general concept of computing helper data for the purpose of reconstructing the data item is known to persons skilled in the art.

For example, international patent application published under WO 2006/053304, and incorporated herein by reference, describes how helper data may be computed and how the enrollment response may be reconstructed; see for example, FIG. 3 and the accompanying description. This patent application also gives more details on how keys may be derived from an enrollment response.

The construction and use of helper data is described more fully in, for example, J. P. Linnartz, P. Tuyls, 'New Shielding Functions to Enhance Privacy and Prevent Misuse of Biometric Templates', In J. Kittler and M. Nixon, editors, Proceedings of the $3^{rd}$ Conference on Audio and Video Based Person Authentication, volume 2688 of Lecture Notes in Computer Science, pages 238-250, Springer-Verlag, 2003 and Y. Dodis et al, 'Fuzzy extractors: How to generate strong keys from biometrics and other noisy data', Advances in cryptology—Eurocrypt 2004, Ser. LNCS, C. Cachin and J. Camenisch, Eds., vol. 3027. Springer-Verlag, 2004, pp. 523-540. See also the patent "Reliable Storage Medium Access Control Method and Device", published as international application with publication number WO/2004/066296, and incorporated herein by reference.

For example, consider a PUF whose responses are bit-strings, or whose responses may be converted to bit-strings. For example, the start-up values in a collection of one-bit memory elements can be regarded as a PUF with a bit-string response. One way of creating helper data is as follows. An error correcting code, e.g. a BCH code, can be selected. A desired data item is converted into a code word of the error correcting code. Note that possibly multiple code words may be needed. An enrollment response of the PUF is XOR-ed with the code word and the result is stored, e.g., in a memory. This result may be used as helper data, since it allows correcting for noise in the PUF response. Later the PUF is challenged again to obtain a further response. The enrollment response and further response should typically differ in fewer bits than the number of errors that the error correcting code can correct. Depending on the application, a certain probability that the number of errors is too large to be corrected may be tolerated. The further response is XOR-ed with the helper data, to obtain a code word having errors. Note that if there were errors in the further response, than these will also be present in the code word having errors. The code word having errors is corrected using an error correcting algorithm corresponding to the code, e.g., using the BCH algorithm. From the resulting corrected code word, the data item can be extracted. Other suitable error correcting codes include Reed Muller, Golay, and Repetition codes or combinations thereof. As is known in the art of error correcting codes, new codes may be obtained by applying construction techniques to known error correcting codes. For example, two error correcting codes may be combined by a technique called code-concatenation to obtain a new code. Error correcting code construction algorithms may be used to tailor an error correcting code to the parameters of the PUF, in particular its error rate and the number of output bits, the desired number of reliable output bits, and the error level that is tolerable in practice for a given application.

Codes of various word sizes can be used. If a code having a word size smaller than the size of the PUF response then part of the PUF response may be discarded, or multiple code words may be concatenated, to that the concatenation is at least as long as the PUF response; if the word size is larger, the PUF response may be padded, e.g. with 0, so that response and word size have equal length.

PUFs may be used in HIS systems. Hardware intrinsic security (HIS) systems are based on physical unclonable functions (PUFs). A PUF can be used to generate a key only when needed, with no need to store the key. The key, once used, can be removed from all internal registers and memories. The key may be reconstructed each time it is used, and disappears when the device is powered down.

Anti-Aging Data

The generation of the response pattern in a semiconductor memory may be sensitive to degradation after repeated applications of the activation signal. This phenomenon may be retarded by writing an appropriate anti-aging pattern in the memory after its start-up values have been read by the PUF control means.

In an embodiment, the system comprises an anti-aging device configured to write to the memory element an inverse of a logical state previously read from the memory element.

It has been found that memories based on feedback effects, such a cross-coupled latches, flip-flops, SRAM etc, are sensitive to degradation after repeated applications of the activation signal, i.e., of being powered-up. That is, after the system has been activated repeatedly the response pattern that is obtained from the memory is drifting away from an enrollment data. Compared to previous read-outs of the memory more and more memory locations enter a different logical state when they are activated. The degradation effect is also called 'aging'.

This phenomenon is particularly problematic if the PUF is to be used for longer periods of time and after a large number of start-ups. Up to a point, error-correcting mechanisms can correct for this behavior by correcting the new deviations, but at some point the response pattern will contain too many errors for them to be corrected.

One mechanism that may cause the problematic degrading is Negative Bias Temperature Instability (NBTI), also known as burn-in. NBTI causes the generation of interface traps under negative bias conditions in pMOS transistors, and thereby causes the threshold voltage thereof to decrease. As a result, the start-up behavior of the affected memory cells changes over time.

It is observed that the degradation effect can be reduced by overwriting memory cells with the inverse value of a value previously read. There are several ways to accomplish this. For example, one could read the logical state of a memory cell after start up, compute the inverse of that logical state, and write the inverse of the logical state back to the memory cell.

A preferred method is to overwrite the memory not with an inverse of the current start-up values, but with an inverse of an enrollment value. Using error correction the PUF control means may obtain an enrollment value, and use the inverse thereof as anti-aging data. This has the advantage that the anti-aging is always done with the same value, which optimizes its effect.

Preventing aging by overwriting the memory with the inverse of the previously obtained content of that memory is further described in the international patent application with application number PCT/IB2009/051592 and title "Method of reducing the occurrence of burn-in due to negative bias temperature instability", which is included herein by reference.

European application EP09167906.8 with title "Physically unclonable function with tamper prevention and anti-aging system", including herein by reference, describes a further improvement to anti-aging. It is observed that security can be further improved, especially against so-called freezing attacks, if only part of the memory elements is overwritten with anti-aging data.

FIG. 1 shows a block diagram which illustrates an electric physical unclonable function (PUF) 100. Physical unclonable function 100 comprises the elements shown in FIG. 1, but may contain additional components as is apparent to the person skilled in the art. Note that the components have a power input for receiving power, e.g., connecting to a power rail. The power inputs are not shown in FIG. 1.

PUF 100 comprises a memory element 110. Memory element 110 comprises a control input 112; in this embodiment a clock input for receiving a clock signal from a clock 130 is used. Memory element 110 comprises a data input 114 for receiving one bit of data for storage in the memory. Memory element 110 further comprises a data output, for reading the contents of memory element 110.

Figure 4A:
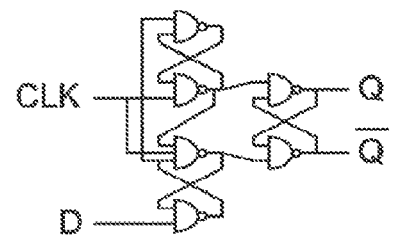
FIG. 4a illustrates a flip-flop which may be used as a memory element in an electric physical unclonable function according to the invention, FIG. 4b identifies latches used in the flip-flop of FIG. 4a, FIG. 5a illustrates a master-slave flip-flop which may be used as a memory element in an electric physical unclonable function according to the invention.

Memory element 110 may for example be a so-called D-flip flop. The D flip-flop is also known as delay flip-flop (as its output Q looks like a delay of input D) or data latch. Conventionally, data input 114 is denoted as clock input 112 as 'CLK' and data output 116 as 'Q'. Memory element 110 may comprise further inputs and/or outputs. The Q output takes on the state of the D input at the moment of a positive edge at the clock pin (or negative edge if the clock input is active low). It is called the D flip-flop for this reason, since the output takes the value of the D input or Data input, and Delays it by maximum one clock count. Conventionally, delay flip-flops are, e.g., used to implement shift-registers and for this reasons they can be found in standard cell libraries. When configured according to the invention they may also be used as a PUF. Memory element 110 may comprise a further data output for reading the complement of the content of memory element 110. FIG. 4a shows a flip-flop which may be used in FIG. 1. Memory element 110 may also comprise one or more further inputs that force the state of the memory element to one of the at least two stable states.

Memory element 110 may also be a so-called latch. In this case the clock input 112 is usually called enable signal denoted as E, EN or other names. When the enable signal 112 is active the signal on the data input 114 is passed to the output 116. When the enable signal 112 is inactive, the signal on the output 116 is held and changes on the data input 114 do not change the value on output 116. Conventionally latches are often used to hold data at a clock domain boundary to fix timing issues and for this reasons they can be found in standard cell libraries.

The embodiment of FIG. 1 could also be used with a delay latch. The D latch passes an input signal to the output when a control signal is active. Different implementations are possible and may be used in the invention. For example, a D latch may have gates controlling the input or it may have a transmission gate. The transmission gate can be built with a FET or with a P FET and an N FET combined, etc. When the enable signal is inactive the power up state only depends on the cross coupling. Typically, the enable port (EN) is used for clocking these circuits.

By writing data to memory element 110 it could be configured into one of the at least two stable states. However, even at start-up when no data has been written to memory element 110, it will settle into a stable state on its own. The state is usually referred to as undefined, but is in actual fact to a large extent determined by the precise way in which the memory element happened to be manufactured. Even slight variations in memory element 110 will influence in what stable state it will start up.

Clock input 112 is shielded from a clock signal produced by a clock 130. A timer 142 is configured to produce a voltage equivalent to logic '0', e.g., represented by a ground voltage, during a certain time period. The time period starts with the power-up of the memory element and lasts for a predetermined period of time. The time period thus includes the powering of PUF 100. The time period is at least long enough to allow memory element 110 to settle into a stable state. The time needed for memory element 110 to settle depends on the precise type of memory employed. Typically, the time needed for a few clock cycles of a clock which runs at a clock speed which falls within the specification of the memory element is sufficient, e.g., of clock 130. After the predetermined time period, timer 142 produces a voltage equivalent to logic '1'. The timer 142 may retime the signal on its output to prevent timing issues. The output of timer 142 is connected to an AND gate 144. The output of AND gate 144 is connected to clock input 112 via a control input line 146. AND gate 144 has two inputs; one of the inputs is obtained from timer 142, the other from clock 130. The effect of AND gate 144 is that during start up a clock signal produced by clock 130 does not propagate to memory element 110, since it is combined using a logic AND, with a logic '0' signal. After the predetermined time period, as dictated by timer 142, the clock is combined using a logic AND, with a logic '1' signal, as a result of which the clock signal does reach memory element 110 at clock input 112.

Depending on the functional polarity of clock input 112, it may be that the AND 144 is replaced by an OR, NAND or NOR function and the polarity of the output of timer 142 is inverted. In this embodiment timer 142 and AND 144 are used as shielding means for memory element 110.

After memory element 110 has settled, its content is read by a PUF control means 120. PUF control means 120 obtains multiple bits of PUF input for constructing a digital identifier. There are several possible sources for obtaining multiple bits: memory element 110 may store multiple bits of data; PUF control means 120 may be connected to multiple memory elements, e.g. multiple latches, or multiple flip-flops, or multiple registers, or a combination of thereof, e.g., a combination of multiple latches and flip-flops; PUF control means 120 may be connected to other suitable PUF inputs, e.g., to a butterfly PUF; etc.

For example, PUF control means 120 may obtain 512 bits of PUF data from 512 latches, but this number is purely exemplary, and depends on the number of bits which are desired in the digital identifier, and amount of noise present. PUF data is data which is at least partially determined by the at least partially random physical characteristics of a physical medium. In the case of memory element 110, the at least partially random physical characteristics of the semiconductor elements making up memory element 110 is a source of PUF data. The at least partially random physical characteristics cannot be controlled during manufacturing, or at least only after a disproportionate amount of effort and resources are expended.

Figure 10:
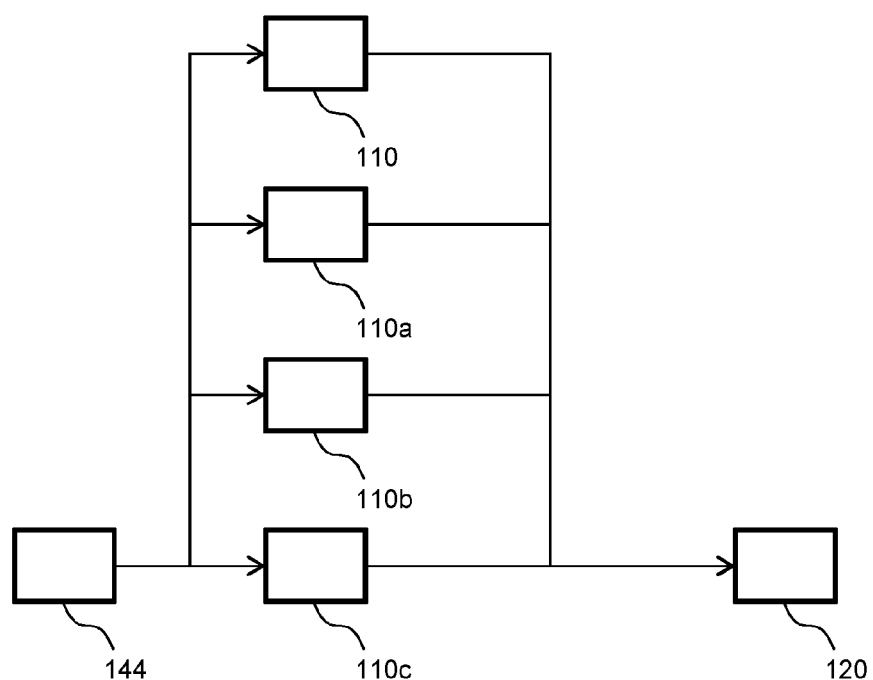
FIG. 10 is block diagram illustrating multiple memory elements.

As an example, FIG. 10 shows schematically how PUF control means 120 may be connected to multiple memory elements. Shown in FIG. 10 are memory element 110, 110a, 110b, and 110c but there may be more memory elements. In the embodiment of FIG. 10, all memory elements share a shielding means, i.e., to shield their clock inputs. It is also possible for each memory element to have its own shielding means.

The PUF data is combined with helper data which has previously been stored in a helper data memory 122. Helper data memory 122 is connected or connectable to PUF control means 120, so that helper data stored in helper data memory 122 can be obtained, e.g. read, by PUF control means 120. By applying a helper data algorithm to the PUF data and the helper data, a digital identifier is produced from which the natural variation across different power-up sequences has been removed. The helper data may be written into helper data memory 122 by the PUF control means during an enrollment phase of the physical unclonable function, e.g., by a manufacturer. The helper data may also be written using external configuration means, in this case PUF control means 120 and helper data memory 122 need not be configured for writing from control means 120 to helper data memory 122.

Helper data may also be obtained from an external source.

Producing helper data and applying helper data algorithms, as such, is known in the art. For completeness, we will give one way how PUF control means 120 may operate.

When PUF 100 is powered for the first time, the contents of memory element 110 and if present all other sources of PUF data are read. From this data a digital string of bits is produced. This digital string of bits is known as the enrolment data. The enrollment data is added, typically by using an XOR operation, to a randomly selected code word from a code which contains code words which are as wide as the digital string of bits. The result of addition is stored as helper data in helper data memory 122. At a subsequent power-up the contents of memory element 110 and if present all other sources of PUF data are read again, a digital string of bits is produced. The new digital string of bits is added to the helper data which was previously stored in helper data memory 122. The result is the code word possibly with the addition of errors. An error correcting algorithm associated with the code is now employed by PUF control means 120 to remove the errors. The result is a code word. Because of the error correcting procedure the corrected code word will be identical at each power-up, even though the PUF data may contain some variation. The error correcting capabilities of the code must be chosen such that, taking the variation of the PUF data into account, the code word can be reconstructed sufficiently often for the current application, say 99% of the time. By adding the corrected code word to the helper data, the original enrollment string is reconstructed. In the embodiment of FIG. 1, the reconstructed enrollment string is placed on output 124 of PUF control means 120. The reconstructed enrollment string may be used for anti-aging but also as digital identifier. Alternatively, PUF control means 120 may output the corrected code word as the digital identifier. Both the corrected code word as the reconstructed enrollment string may be further processed, e.g., by a cryptographic hash function to. Said further processing may be done in PUF control means 120 or elsewhere.

There are various other ways to construct helper data and to reconstruct the enrollment string.

The reconstructed enrollment string is placed on a data line 126 for transferring a reconstructed enrollment string to anti-aging means 150. Anti-aging means controls a MUX 156. MUX 156 has two inputs; MUX 156 is connected to anti-aging means 150 via an anti-aging data line 152 over which MUX 156 receives anti-aging data from anti-aging means 150; MUX 156 is further connected to data output 116 via data line 118 to receive as other input the data stored in memory element 110.

The output of MUX 156 is connected to data input 114. During a time period starting from power-up and lasting at least until PUF control means 120 has read the start-up contents from memory element 110, anti-aging means 150 controls MUX 156 such that it forwards the input received over data line 118 to data input 114. As a result the start-up data is continuously re-entered at data input 114. The effect is that memory element 110 stores the data value and operates like a register. After PUF control means 120 has reconstructed the enrollment data, anti-aging means 150 instructs MUX 156 over MUX control line 154 to forward the data it receives over anti-aging data line 152. Part of the enrollment data corresponds to memory element 110; this part is the data which was read from memory element 110 during the enrollment phase. If no noise altered the start-up value of memory element 110 then his part is identical to the current start-up value of memory element 110. It may be however, that the value of memory element 110 was altered due to variations, either during enrollment or during the present power-up sequence. Anti-aging means 150 inverts the part of the enrollment data that corresponds to memory element 110, so as to compute anti-aging data. The anti-aging data is forwarded to MUX 156 over anti-aging data line 152. After anti-aging means 150 has instructed MUX control line 154 to use input anti-aging data line 152, the anti-aging data will be written into memory element 110.

Anti-aging means 150 may be configured to start the over-writing of memory element 110 when it receives the enrollment string of PUF control means 120. Anti-aging means 150 may be integrated with PUF control means 120. In the embodiment of FIG. 1, the influence from spurious signals on data port 114 are reduced since clock input 112 is shielded.

During operation, PUF 100 may operate as follows.

Initially, PUF 100 is not in a powered state. When PUF 100 is powered-up, memory element 110 will start to settle into one of its stable states. More or less at the same time, clock 130 will start to create a clock signal. Timer 142 will start to produce a logic '0'. AND gate 144 will block the clock signal that clock 130 generates from reaching memory element 110. Memory element 110 can thus settle without being disturbed by the clock. After memory element 110 settled into a stable state, the time limit of timer 142 expires, and timer 142 starts to produce a logic '1'. The clock signal can now pass from clock 130 to clock input 112. Each time a clock tick reaches clock input 112, memory element 110 is activated to over-write its content with the content offered on data input 114. At this time anti-aging means 150 still instructs MUX 156 to forward the input received over data line 118. Thus memory element 110 overwrites its contents at each clock tick, however it overwrites it with the same value. Thus the start-up content of memory element 110 is persevered. At some point after powering memory element 110, PUF control means 120 becomes active. This may be relatively soon after powering-up as part of the boot sequence of memory element 110, but this may also happen sometime later, as part of a security application which is started. PUF control means 120 reads the content of memory element 110, and possibly of multiple memory elements 110's. Using helper data which was stored after a previous powering-up of memory element 110, PUF control means 120 reconstructs the enrollment string and produces a digital identifier. The enrollment string is forwarded to anti-aging means 150. At this point anti-aging means 150, identifies which part of the enrollment string was previously read from memory element 110 and inverts this part, this part may be a single bit, in case memory element 110 is a flip-flop or a latch, or it may be multiple bits if memory element 110 is a larger memory element or a combination of multiple elements. Anti-aging means 150 now sends the inverse of said part of the enrollment string to MUX 156 over anti-aging data line 152 and send a signal over MUX control line 154 that instructs MUX 156 to forward the input received over anti-aging data line 152 instead of the input received over data line 118. As a result, the content of memory element 110 is overwritten with anti-aging data and the useful lifetime of memory element 110 as a PUF is prolonged.

After writing anti-aging data, MUX 156 is switched back such that the stored anti-aging data remains stored in the memory 110.

The shielding of PUF 100 from the clock by timer 142 increases the dependency of memory element 110 on the at least partially random physical characteristics of (some of) its constituting gates, and decreases the chaotic behavior of memory element 110 by decreasing the potential influence of some of its other gates.

PUF 100 may be simplified in several ways.

For example, the use of anti-aging may be discarded. This could shorten the useful lifetime of memory element 110 as a PUF, but on the other hand decreases the complexity and cost of PUF 100. If anti-aging is not used, then anti-aging means 150, MUX 156, anti-aging data line 152, MUX control line 154 and data line 126 may be discarded. Data line 118 would be connected from data output 116 directly to data input 114 instead of MUX 156.

The embodiment shown in FIG. 1 is configured as an electronic PUF with a single challenge, i.e., powering up.

Furthermore, PUF control means 120 may be simplified by dispensing with correcting the variation in the PUF data. If this is done, helper data memory 122 may be discarded, as no helper is needed. If anti-aging is still used, it would use the inverse of the content of memory element 110 instead of the inverse of part of the enrollment string. In that case, data line 118 would be connected both to MUX 156 and to anti-aging means 150. Anti-aging means 150 may receive a signal from PUF control means 120, to indicate that the digital identifier has been constructed. A digital identifier from which noise is not removed may still be useful for identifying memory element 110 and by implication PUF 100, if the noise is sufficiently small when compared to the variation in start-up values across devices. A further simplification is obtained by dispensing both with anti-aging and with error correcting.

Figure 2A:
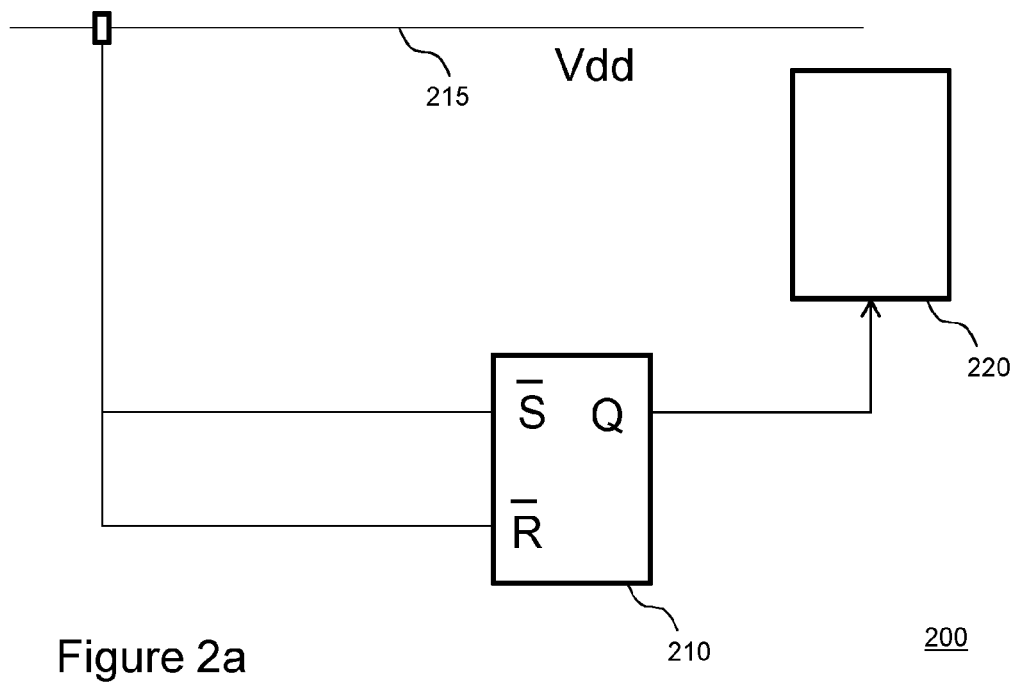
FIG. 2a is a block diagram illustrating a second embodiment of an electric physical unclonable function according to the invention.

FIG. 2a shows an electric physical unclonable function 200, which is a simpler embodiment of the invention.

PUF 200 comprises a latch 210 as memory element. Latch 210 is an SR NAND latch and may be constructed in the manner shown in FIG. 2b. The latch shown in FIG. 2b comprises two NAND gates, labeled 230 and 240, which are connected in a cross-coupled loop. The output of gate 230 is connected to an input of gate 240 and the output of gate 240 is connected to an input of gate 230. Each gate has one input which is not connected to the output of the other gate. These two inputs are control inputs and may be used to control the stable state of the memory element. The control inputs of latch 210 are directly and permanently connected to a positive supply voltage 215. As result of this connection, the possibility of controlling the stable state of latch 210 has been lost; on the other hand the dependency of latch 210 on the at least partially random physical characteristics of its gates has been improved. PUF 200 further comprises a PUF control means 220 for reading PUF data and for deriving the digital identifier.

The embodiment shown in FIG. 2 is configured as an electronic PUF with a single challenge, i.e., powering up.

Figure 2B:
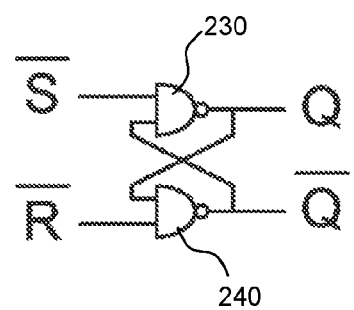
FIG. 2b is a block diagram illustrating a latch for use in the electric physical unclonable function of FIG. 2a, FIGS. 3a, 3b and 3c illustrate latches which may be used as a memory element in an electric physical unclonable function according to the invention.

Latches which may be used for the invention come in many forms and types. They are usually built with cross coupled NAND gates, NOR gates or inverters. A Set Reset latch (also called Set Reset flip-flop) is one of the simplest latches. It can be built with cross coupled NAND gates (active low set and reset signals) or NOR gates (active high signals). A SR NAND latch is shown in FIG. 2b. When the set and reset signals are inactive the power up state only depends on the cross coupling.

Figure 3A:
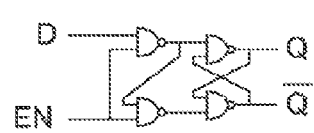
Figure 3B:
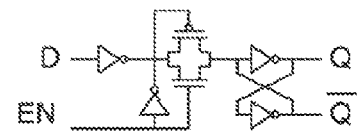
Figure 3C:
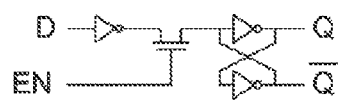

FIGS. 3a, 3b and 3c show three latches which may be used in the invention, for example, in a configuration such as shown in FIG. 1 or 2a. When used in the embodiment of FIG. 1, the D input would be used as port data input 114 and the EN input as port clock input 112, the Q output as data output 116. When the embodiment of FIG. 2 is used, the EN would be connected to Gnd (ground), similar to the connection of S and R inputs to Vdd (positive supply voltage) as shown in FIG. 2a. In this specific case the D input can be connected to either Vdd or Gnd.

Other types of latches are possible, e.g. a latch that has an active low EN signal instead of an active high EN signal as shown in FIGS. 3a, 3b and 3c. For those latches the EN signal should be connected to Vdd. The D input of said latch can then still be connected to either Vdd or Gnd.

FIG. 4a shows a D flip-flop which may be used in the invention as memory element, for example in the embodiment of FIG. 1 or 2.

Flip-flops are logical components, similar to latches, which are available in the standard cell libraries of an IC technology node. When powering up a device, the flip-flops contained in the device will start up with random values that depend on internal physical device characteristics. Hence the power up states of different flip-flops can be used as a physical unclonable function. When the content of a sufficient number of flip-flops is combined in a digital identifier, the result will be unique for the electronic device in which they are contained.

An advantage of using latches, flip-flops or registers, compared to SRAM PUFs is the fact that flip flops are easily spread in a design and hard to find by an attacker, whereas SRAM memories are visible as relatively large high-density structures in an IC.

The flip-flop implementation shown in FIG. 4a is build with three Set-Reset (SR) latches built with NAND gates. The three latches are identified in FIG. 4b as latches 410, 420 and 430. Latches 410 and 420 are used for controlling the flip-flop. Latch 430 is responsible for actually storing the content of the flip-flop. The flip-flop may also be built using a NOR implementation, this would result in an active low clock. Yet other implementations are also possible. The outputs only change when a positive edge occurs on the clock signal. Note that one of the gates in latch 430 is a three-input gate to connect latch 410 and 420.

Figure 4B:
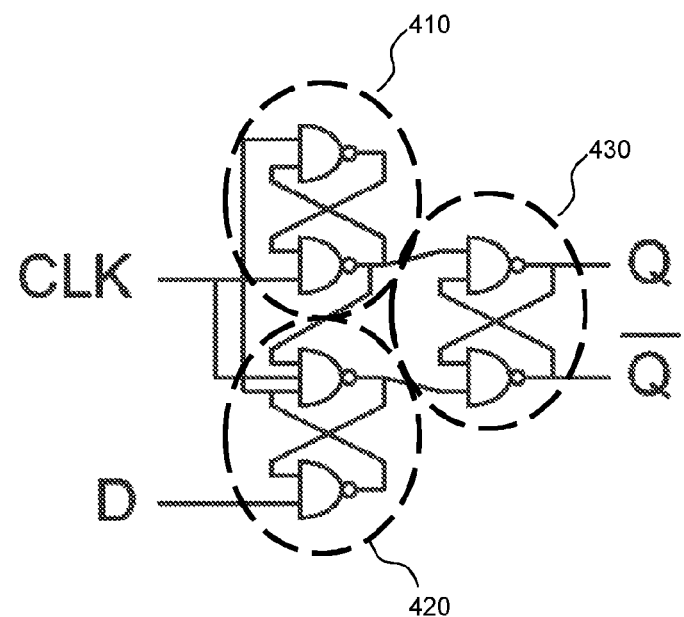

When the clock is low the power-up state depends only on the latch 430. When the clock is high the power-up state also depends on the other two latches 410 and 420. FIG. 4b clearly shows the advantage of shielding the clock from the memory element during power-up. If the power-up state of a memory element depends on a different number of gates, in particular a different number of latches, depending on whether the clock is active or not, then shielding the clock improves the reliability of the memory element as PUF data source.

Figure 5A:
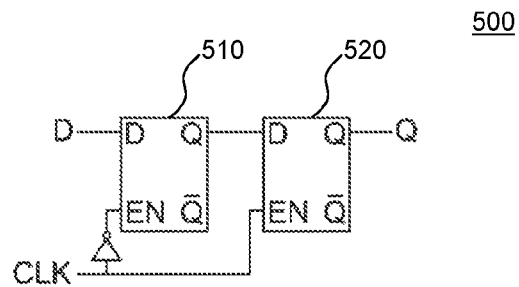
FIG. 5b illustrates an alternative shielding means structure, which may be used for shielding a master-slave flip-flop.

FIG. 5a shows a master slave D-flip-flop 500, which is another useful memory element which may be used in the invention. It is built with two D-latches: first D-latch 510 and second D-latch 520. The Q output of first D-latch 510 is connected to the D input of second D-latch 520. A clock signal is connected to the EN input of first D-latch 510 and second D-latch 520 but, for first D-latch 510 the clock signal is first routed through an inverter. The D input of first D-latch 510 is considered the D input of the combination, i.e. of the master-slave flip-flop. The Q output of second D-latch 520 is considered the Q output of the combination, i.e. of the master-slave flip-flop. The CLK line may be used as enable (EN) line. The master-slave flip-flop 500 may comprise one or more other inputs, e.g. inputs that put the flip-flop in a predefined state, usually referenced as S and R.

When the clock is low the power-up state depends on the second D-latch 520. When the clock is high the power-up state depends on the first D-latch 510. This principle can be used as a challenge/response mechanism with 2 challenges: a first challenge of the master-slave D-flip-flop PUF is given by keeping the clock input low while powering up the device, the second one by keeping the clock input high when powering up the device. The embodiment could be provided with helper data for each of its challenges. Alternatively, helper data for one challenge may be available on the device, while helper data for the other challenge is stored external from the device. By selecting, during powering-up master-slave flip-flop 500, if the EN port is connected to a low voltage, i.e., logic '0' or to a high voltage, i.e., logic '1', one may determine if the start-up value of the master-slave flip-flop 500 is determined by the cross-coupled loop of first D-latch 510 or of second D-latch 520.

Master-slave flip-flop 500 is a memory element comprising two cross-coupled loops, one in first D-latch 510 and one in second D-latch 520. The memory element comprises a clock input for receiving a clock signal which is internally routed; to first D-latch 510 after being inverted and to second D-latch 520 as received. Master-slave flip-flop 500 may be used in the configuration of PUF 100, wherein memory element 110 is replaced by master-slave flip-flop 500; The D port of master-slave flip-flop 500 taking the place of data input 114; the CLK port of master-slave flip-flop 500 taking the place of clock input 112; and the Q port of master-slave flip-flop 500 taking the place of data output 116.

The configuration shown in PUF 100 is not configured for multiple challenges, but may be modified as follows. A selection means is added which outputs a logic '0' or a logic '1' to select which cross-coupled loop should determine the power-up value of the master-slave flip-flop 500. For example, the selection means may comprise a one bit non-volatile memory or an input pin, which can be set either by the electronic device containing the PUF or externally. AND gate 144 is replaced by a more complicated logic circuit which performs the logic dictated by the following formula: (NOT (timer) AND (select)) OR (CLK AND timer). In this formula 'timer' represents the output of timer 142, timer being 0 while the timer has not yet expired, and 1 after, and 'select' the output of the selection means.

The effect of this logic circuit is that if 'select' is low, the normal behavior of PUF 100, i.e., as dictated by AND gate 144 is followed. But if 'select' is high, a high signal is sent to master-slave flip-flop 500 while timer is low. Once the output of timer 142 is high, i.e., once the power-up sequence is over, master-slave flip-flop 500 receives the clock signal as normal.

Figure 5B:
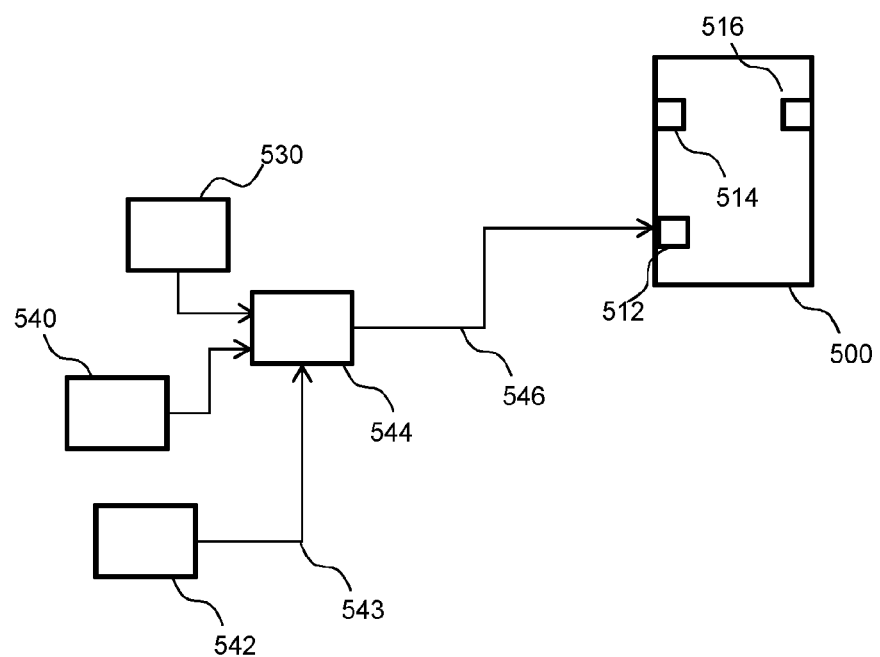

FIG. 5b shows a possible embodiment of the selection means. If the master slave flip-flop 500 is used as memory element 110 in FIG. 1, then the selection means shown in FIG. 5b may be used to replace elements 110, 112, 114, 116, 130, 142, 144 and 146 in FIG. 1. Memory element 500 is the master-slave flip-flop from FIG. 5a. It comprises a clock input 512, a data input 514 and a data output 516. It may comprise other inputs and outputs. Challenge selector 540 selects between the first D-latch 510 in the master-slave flip-flop 500 and the second D-latch 520. Clock 530 is the clock that is used in normal operation of the master-slave flip-flop 500. Selector 544 is a mux implementing the aforementioned formula. Based on a selection signal 543 it either passes the output of the clock 530 or the challenge selector 540 to its output connected to clock signal 546. Timer 542 determines which one of the clock and challenge select signals must be routed towards clock signal 546. Control input 512, data input 514 and data output 516 in FIG. 5b are marked CLK, D and Q respectively in FIG. 5a.

An electric physical unclonable function (PUF) allowing two different challenges has independent inventive merit, even without the use of a shielding means; for example, an electric physical unclonable function (PUF) comprising a semiconductor memory element connectable to a PUF control means for reading content from the memory element and for deriving at least in part from said content a digital identifier, the memory element being of a type that is configurable into at least two different stable states, the stable states representing the content of the memory element, the memory element comprising a power input for electrically powering the memory element and bringing the memory element into a powered-up state, and a control input for receiving one or more control signals, the control signals configuring the memory element into a selected one of the at least two different stable states, the memory element being configured to settle into one of the at least two different stable states upon power-up, the particular stable state into which the memory element settles being dependent at least in part upon the at least partially random physical characteristics of the memory element, wherein the memory element comprises two cross-coupled loops, a selection means being configured for selecting one of the two cross-coupled loops, the particular stable state into which the memory element settles upon power-up being dependent upon the at least partially random physical characteristics of the selected one of the two cross-coupled loops but not upon the unselected one of the two cross-coupled loops.

By combining this electronic PUF with a shielding means its quality as a PUF is improved.

FIGS. 6a, 6b, 6c and 6d

It is also possible to use a register as a memory element and to function as the source of PUF data in an electronic PUF. A register has its output fed back into its D input via a MUX (multiplexer) to allow controlled writing. When the LD signal (load) is active the input is loaded on the next clock edge or latch enable, else it keeps its current value. By keeping the LD signal in an inactive state the register will act as a PUF. In this way the D input always receives the signal present on the Q output of the flip-flop or latch. Even if the clock or enable signal toggled the value of the signal at the IN input is not clocked into the flip-flop or latch. By shielding the CLK signal in the registers shown FIGS. 6a and 6b, its PUF behavior is improved.

Because of the extra loop through Q and D (and the activity of the clock or enable signal) the PUF behavior will be different from the situation when the clock or enable signal is inactive.

Figure 6A:
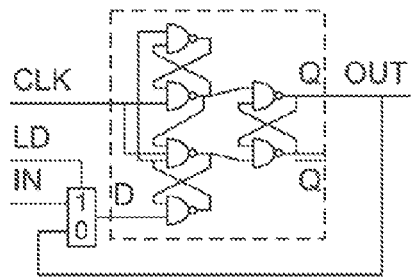
FIGS. 6a, 6b, 6c, and 6d illustrate memory elements which may be used as a memory element in an electric physical unclonable function according to the invention.
Figure 6B:
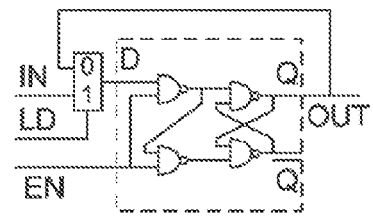
Figure 6C:
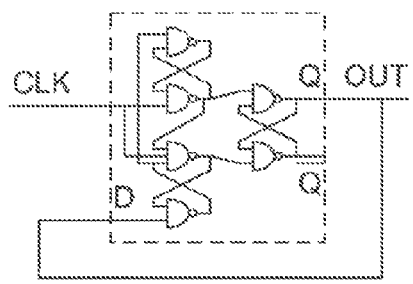
Figure 6D:
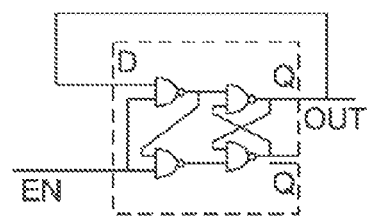

For getting only PUF behavior out of the above circuit, the muxes are not necessary. One could also make a simpler scheme without muxes as is depicted in FIGS. 6c and 6d. Because the loop through Q and D is slightly different from the one with the MUX and due to the loop delay, the PUF behavior will again be different.

In the above circuits shown in FIGS. 6a, 6b, 6c and 6d the flip-flops and latches that are used can also be replaced by other types of flip-flops or latches.

Figure 7:
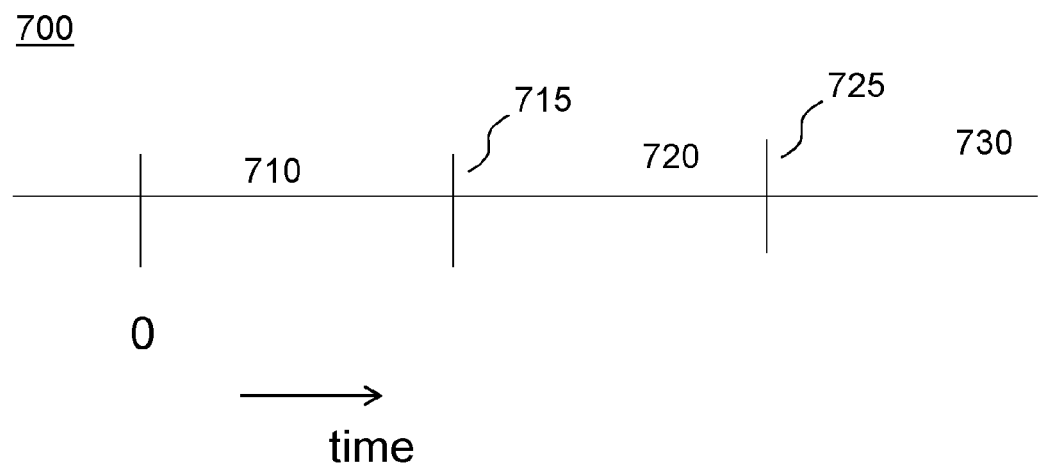
FIG. 7 is a time diagram illustrating the invention.

FIG. 7 shows a diagram 700 to illustrate how shielding may be distributed over different modules.

In time diagram 700 time is illustrated on the horizontal axis, and progresses from left to right. In the time period before the moment marked '0' the memory element or even the entire device in which the memory element is comprised, is switched off and is not powered. At moment '0', power is switched on. At moment 0, the memory element is not in a stable state, but as a result of the powering, it will start to settle during a first time period 710. At moment 715, the end of the first time period, the memory element is settled in a stable state. No writing to the memory element has occurred. During period 710 the shielding is preferably done using hardware shielding means; for example, by connecting a control input with a reference voltage, or by gating the clock signal going to the memory element. After moment 715 a second time period 720 starts. During time period 720 the start-up contents of the memory element may be preserved by the same hardware shielding means used during period 710, but the shielding may also be done using other hardware means or using software means. For example, writing to the memory element may be disabled during period 710, in the sense that it would be impossible for a software program the write during that period, as the writing signal would not reach the memory element. During period 720, after the memory has settled in a stable state, writing to the memory element could be enabled, as long as it is avoided, for example by configuring software running on the device to avoid writing this memory element.

Somewhere in period 720 the PUF control means reads the contents of the memory element. When the PUF control means is finished reading, the period 720 ends, marked by moment 725. At that time a third period 730 starts. There are several possibilities to continue during period 730. For example, the memory element may remain in the stable state it settled in during power-up; this behavior may be obtained by permanently blocking write signals to the memory element. As a further example, in period 730 the content of the memory element may be overwritten with anti-aging data; this behavior may be obtained by temporarily blocking write signals until some point before moment 725 and using anti-aging means during period 730 to overwrite the start-up data with anti-aging data. As a further example, the memory element may be overwritten, e.g., with a constant such as 0 or with random data; this behavior may improve security by making sure no traces of the security sensitive material remains in the memory element, when it is no longer needed. Part of the memory may be overwritten with anti-aging data and parts with other data such a constant or random data.

Figure 8A:
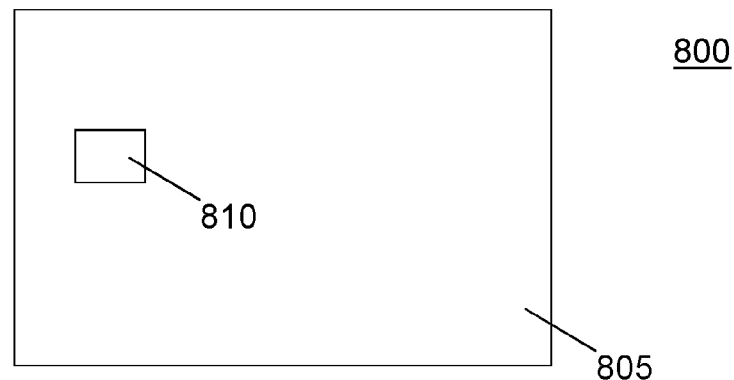
FIG. 8a shows a schematic top-view of a smart card.
Figure 8B:
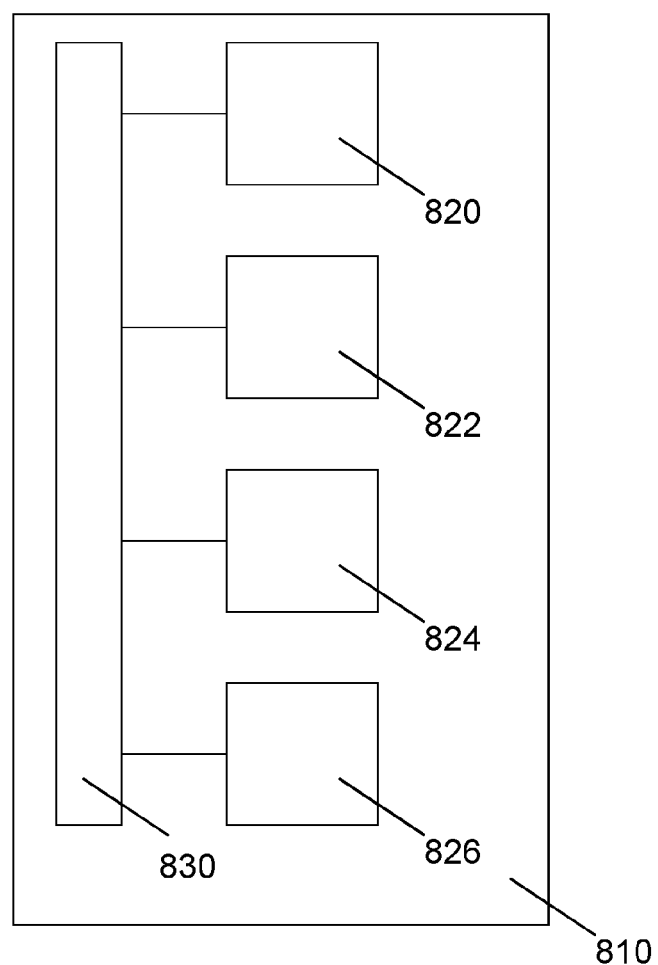
FIG. 8b is a block diagram illustrating an integrated circuit.

FIG. 8a shows in top-view a schematic representation of a smart card 800 according to the invention. The smart card comprises an integrated circuit 810 and a, typically plastic, card 805 supporting integrated circuit 810. The architecture of integrated circuit 810 is schematically shown in FIG. 8b. Circuit 810 comprises a processing unit 820, e.g. a CPU, for running computer program components to execute a method according to the invention and/or implement its modules. Circuit 810 comprises a memory 822 for storing programming code, data, cryptographic keys, helper data etc. Part of memory 822 may be read-only. Part of memory 822 may be high security memory, e.g., fuses for storing security related data, e.g., keys. Circuit 810 comprises a physical unclonable function 824. For example, PUF 824 may comprise a memory element and a shielding means. Physical unclonable function 824 may be combined with memory 822. For example, the memory element of PUF 824 may be part of memory 822. Memory 822 may be a combination of read-write and read-only memory, and/or of volatile and non-volatile memory. Circuit 810 may comprise a communication element 826, e.g., an antenna, connector pads or both. Circuit 810, memory 822, PUF 824 and communication element 826 may be connected to each other via a bus 830. The card may be arranged for contact and/or contact-less communication, using an antenna and/or connector pads respectively. The smart card may be used, e.g., in a set-top box to control access to content, in a mobile phone to control access to a telecommunication network, in a public transport system to control access to public transport, in a banking card to control access to a bank account, etc.

For example, memory 822 may comprise software for execution by processing unit 820. For example, the PUF control means may be implemented in software and stored in memory 822 for execution by processing unit 820. When said software is executed the memory element of PUF 824 is read, helper data of 822 is read and a digital identifier, e.g., a cryptographic key, is derived by unit 820. The smart card may comprise further non-memory based PUF, for example, a delay PUF.

The invention is not limited to smart-cards and could be embodied on other integrated circuits, e.g., as used in mobile phones, set-top boxes, computers, access control systems, etc.

Figure 9:
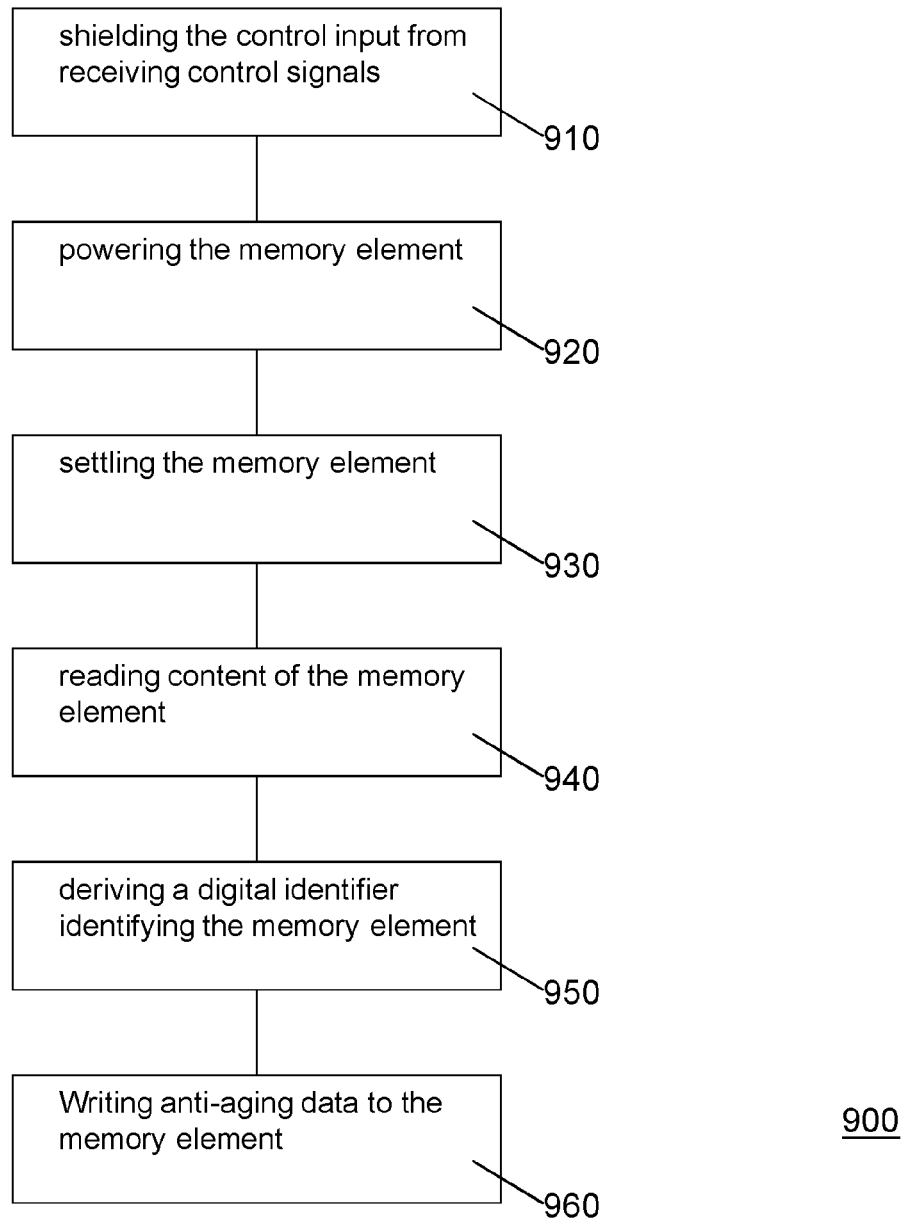
FIG. 9 is a flow chart illustrating an embodiment of a method according to the invention.

FIG. 9 illustrates in a flow chart a method according to the invention. The flowchart shows 6 steps in a possible order.

Step 910 comprises shielding the control input from receiving control signals. Step 920 comprises powering the memory element. In Step 930 the memory elements settles into a stable state. Step 940 comprises reading content of the memory element. Step 950 comprises deriving a digital identifier. Step 960 comprises writing anti-aging data to the memory element.

Many different ways of executing the method are possible, as will be apparent to a person skilled in the art. For example, the order of the steps can be varied or some steps may be executed in parallel. For example, step 910 is continued until step 940 is at least partially completed. Step 960 is optional. Moreover, before, in between and after steps of the method other steps may be inserted. The inserted steps may represent refinements of the method such as described herein, or may be unrelated to the method. Moreover, a given step may not have finished completely before a next step is started.

Although the method according to the invention may be implemented in dedicated hardware, a method according to the invention may be entirely or partially executed under the control of software, which comprises instructions for causing a processor system to perform method 900. Software may only include those steps taken by the server or the computing device during the enrollment and/or the reconstruction phase.

The software may be stored in a suitable storage medium, such as a hard disk, a floppy, a memory, etc. The software may be sent as a signal along a wire, or wireless, or using a data network, e.g., the Internet. The software may be made available for download and/or for remote usage on a server.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An electric physical unclonable function (PUF) (100, 200) comprising a semiconductor memory element (110) connectable to a PUF control means (120) for reading content from the memory element and for deriving at least in part from said content a digital identifier, the memory element being of a type that is configurable into at least two different stable states, the stable states representing the content of the memory element,
the memory element comprising
a power input for electrically powering the memory element and bringing the memory element into a powered-up state, and
a control input (112) for receiving one or more control signals, the control signals configuring the memory element into a selected one of the at least two different stable states,
the memory element being configured to settle into one of the at least two different stable states upon power-up, the particular stable state into which the memory element settles being dependent at least in part upon the at least partially random physical characteristics of the memory element,
wherein
the particular stable state into which the memory element settles upon power-up is also dependent upon the control input receiving a control signal,
the electric physical unclonable function further comprises shielding means (142, 144) for shielding, during a time period including the power-up of the memory element and lasting at least until the settling of the memory element, the control input from receiving control signals upon which the particular stable state into which the memory element settles is dependent, by connecting the control input with a reference voltage line.

2. An electric physical unclonable function (PUF) as in claim 1
wherein the memory element comprises a plurality of interconnected semiconductor gates allowing at least two different stable states when the memory element is in the powered-up state, the physical, at least partially random, characteristics of the memory element comprising the at least partially random physical characteristics of the plurality of interconnected semiconductor gates.

3. An electric physical unclonable function as in claim 2, wherein the interconnected semiconductor gates comprises at least two gates connected in a cross-coupled loop.

4. An electric physical unclonable function as in claim 3, wherein at least one of the two gates connected in the cross-coupled loop is a multiple input gate.

5. An electric physical unclonable function as in claim 4, wherein the memory element is a latch, a flip-flop or a register.

6. An electric physical unclonable function (PUF) as in claim 1, wherein the time period lasts at least until the reading of the content of the memory element by the PUF control means.

7. An electric physical unclonable function as in claim 1, wherein the deriving of the digital identifier depends on a first and a second type of data, the first type of data being previously deterministically stored in non-volatile memory (122), the second type of data depending at least in part upon the at least partially random physical characteristics of a memory element, the data of the second type being read exclusively from one or more memory elements as defined in claim 1 having shielding means.

8. An electric physical unclonable function as in claim 7, wherein the shielding means comprises a permanent connecting between the control input and the reference voltage line.

9. An electric physical unclonable function as in claim 1, wherein the memory element comprises a latch, having a set control input and a reset control input, the set control input and the reset control input being each connected to a reference voltage line such that the latch is in a keep state for preventing changes to the stable state into which the latch settled upon power-up.

10. An electric physical unclonable function as in claim 1, wherein the shielding means comprises a timer, for shielding for a time period starting with the power-up of the memory element and lasting for a predetermined period of time.

11. An electric physical unclonable function as in claim 1, wherein the control input for receiving one or more control signals comprises a clock input, at least part of the memory element being activated upon receiving a clock tick over the clock input, and wherein the shielding means is configured for shielding the clock input from receiving the clock tick.

12. An electric physical unclonable function as in claim 11, wherein the memory element comprises a register having a gated clock, the shielding means being configured to control the gating of the gated clock.

13. An electric physical unclonable function (500) as in claim 11, wherein the memory element comprises two cross-coupled loops, the shielding means being configured for shielding the clock input by selectably connecting the clock input to a high reference voltage or to a low reference voltage, the selected voltage further selecting one of the two cross-coupled loops, the particular stable state into which the memory element settles upon power-up being dependent upon the at least partially random physical characteristics of the selected one of the two cross-coupled loops but not upon the unselected one of the two cross-coupled loops.

14. An electric physical unclonable function as in claim 1, wherein the shielding means comprises hardware shielding means for shielding, at least during a time period lasting until completion of the power-up of the memory element, the control input from receiving control signals upon which the particular stable state into which the memory element settles is dependent.

15. An electric physical unclonable function as in claim 14, wherein the shielding means comprises software shielding means for shielding, at least during a time period lasting from the settling of the memory element until the reading of the content of the memory element by the PUF control means.

16. An electric physical unclonable function as in claim 1 wherein the shielding means is configured to stop the shielding of the memory element after the reading of the content of the memory element by the PUF control means to allow writing of content to the memory element by enabling the memory element to change from one stable state to another upon receiving at least one control signal while the memory element is in the powered-up state.

17. An electric physical unclonable function as in claim 16 comprising anti-aging means for writing anti-aging data into the memory element after the reading content of the memory element.

18. A method of operating an electric physical unclonable function (PUF) comprising a semiconductor memory element, the memory element being of a type that is configurable into at least two different stable states, the stable states representing the content of the memory element, the memory element comprising a control input for receiving one or more control signals, the control signals configuring the memory element into a selected one of the at least two different stable states,
the method comprising
powering the memory element and bringing the memory element into a powered-up state, the memory element settling into one of the at least two different stable states upon the powering,
the particular stable state into which the memory element settles being dependent at least in part upon the at least partially random physical characteristics of the memory element,
reading content of the memory element, and
deriving at least in part from said content a digital identifier,
wherein
the particular stable state into which the memory element settles upon power-up is also dependent upon the control input receiving a control signal, and wherein the method further comprises
shielding, during a time period including the power-up of the memory element and lasting at least until the settling of the memory element, the control input from receiving control signals upon which the particular stable state into which the memory element settles is dependent, by connecting the control input with a reference voltage line.

* * * * *